US011313344B2

(12) United States Patent
Bassi et al.

(10) Patent No.: US 11,313,344 B2
(45) Date of Patent: Apr. 26, 2022

(54) POWER GENERATING USING LAVA LAMP SYSTEM

(71) Applicant: King Abdulaziz University, Jeddah (SA)

(72) Inventors: Hussain Mohammad Bassi, Jeddah (SA); Muhammad Adnan Basha, Jeddah (SA)

(73) Assignee: King Abdulaziz University, Jeddah (SA)

( * ) Notice: Subject to any disclaimer, the term of this patent is extended or adjusted under 35 U.S.C. 154(b) by 283 days.

(21) Appl. No.: 16/048,916

(22) Filed: Jul. 30, 2018

(65) Prior Publication Data
US 2020/0032767 A1 Jan. 30, 2020

(51) Int. Cl.
*F03B 17/06* (2006.01)
*F03B 17/00* (2006.01)
*F03G 6/06* (2006.01)

(52) U.S. Cl.
CPC .......... *F03B 17/064* (2013.01); *F03B 17/005* (2013.01); *F03G 6/06* (2013.01); *Y02E 10/46* (2013.01)

(58) Field of Classification Search
CPC ........ F03B 17/064; F03B 17/005; F03G 6/06; Y02E 10/46
USPC .......................................... 60/639, 495, 496
See application file for complete search history.

(56) References Cited

U.S. PATENT DOCUMENTS

| 4,038,826 A | * | 8/1977 | Shaw | F03B 17/02 60/641.14 |
| 9,657,723 B1 | | 5/2017 | Iyer et al. | |
| 9,673,681 B2 | | 6/2017 | Hopper et al. | |
| 2003/0145589 A1 | * | 8/2003 | Tillyer | F03B 17/02 60/496 |
| 2006/0272327 A1 | * | 12/2006 | Souris | F03B 17/04 60/495 |
| 2011/0162356 A1 | * | 7/2011 | Hastings | F03B 17/02 60/495 |
| 2013/0205768 A1 | * | 8/2013 | Kim | F03B 17/02 60/495 |
| 2015/0308401 A1 | * | 10/2015 | Edwards | F03G 7/05 60/496 |

FOREIGN PATENT DOCUMENTS

CN 102444534 A 5/2012

* cited by examiner

*Primary Examiner* — Hoang M Nguyen
(74) *Attorney, Agent, or Firm* — Oblon, McClelland, Maier & Neustadt, L.L.P.

(57) ABSTRACT

A convective power generation device is described based on thermal convection and thermal input energy. The energy generation device operates by heating wax and oil by heat from a solar concentrator or geothermal energy; as the weight of the wax becomes liquid that is lighter than the oil, the liquid wax moves up through a pathway; when the liquid wax reaches the top of the pathway, the cooler wax falls towards collecting cups mounted to a continuous belt and forces the belt downward to rotate the belt; when a collector cup of wax reaches the bottom of belt rotation, the wax falls to a reservoir; and the rotation of the belt drives a gearbox, which drives a generator to produce electric power. The convective power generation device has been shown to have higher energy conversion efficiency than photovoltaics.

16 Claims, 4 Drawing Sheets

POWER GENERATING USING LAVA LAMP SYSTEM

BACKGROUND

Field of the Invention

The present disclosure relates generally to an energy generation device based on thermal convection and thermal input energy.

Description of the Related Art

Various methods for generating electric energy utilizing kinetic energy have been used over the years. The methods range from using vertical motion of a weighted object, flow of water or other fluid, or a combination that causes movement of a floating container through control of fluid flow. In addition, other types of motion such as convection currents may potentially provide a source of useful kinetic energy. For example, US patent application publication 2010/117374A1 discloses an arrangement that uses a static weight. The static weight can be placed, pushed, or rolled onto a platform or shelf, controlled in its vertical motion downward, and connected to an electric generator, which transforms the vertical linear motion to electricity. This arrangement requires a complex apparatus (such as a forklift) to lift the static weight up.

WO 2011072280A2 discloses an arrangement for converting energy from a fluid in a fluid source into usable energy. The arrangement uses a container that is floating on a fluid. When the volume of the fluid in a lower tank is high, it pushes the container up and when the fluid is pumped up to an upper tank the container moves downward to the less fluid amount tank. This approach requires fast pumping to keep the container moving at the desired speed and maintain 60 Hz electricity output or requires use of a speed up gearbox with a high ratio, which is not desired. Also, this arrangement requires a huge amount of fluid to fill the tanks to make a difference in the fluid volume between the upper and lower tank to have the container move.

Convection currents are movements of liquid or gas caused by temperature differences. Warmer material tends to rise, displacing cooler matter. In particular, heated material expands, becoming less dense. This causes the material to rise within a fluid, displacing any cooler material. The cooler material will move elsewhere in the fluid, and may in turn encounter a heat source. In which case, the cooler material may become agitated by the heat source and rise, while the previously heated material will cool and descend. This effect causes convection currents.

A Lava Lamp® is described in U.S. Pat. No. 3,387,396 as a display device. The Lava Lamp® uses convection currents to provide a visual effect. The Lava Lamp® uses a light bulb to generate heat to cause convection currents, as well as to apply light. The moving material may be in the form of a globule or globules that ascend and circulate in a container and produce shapes and/or patterns which are fascinating and relaxing to observe, particularly when the device is illuminated and if a liquid containing the globule, or the globule, or both, is colored. The globule or globules may be of one liquid that is suspended in another liquid. The liquid in which the globule is suspended may be dyed water. The liquid forming a globule is chosen based on several considerations, including: the relative densities of the liquids at the desired operating temperature of the device and at room temperature, the liquids must be immiscible, and the surface tension must be such that the globule does not adhere to the walls of the container. Mineral oil or paraffin are a suitable liquid for the globule. The globule may be a liquid that has a melting point above room temperature so that emulsification cannot take place at room temperature. Also, the liquid for the globule may contain a thickening or gelling agent which is soluble in the liquid. An example gelling agent is a wax, such as paraffin wax, or petroleum jelly. An electric bulb illuminates the device from underneath the container, and also causes heat to be applied slowly. An example operating temperature range is 45 to 50° C. at which the globule will become fluid.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
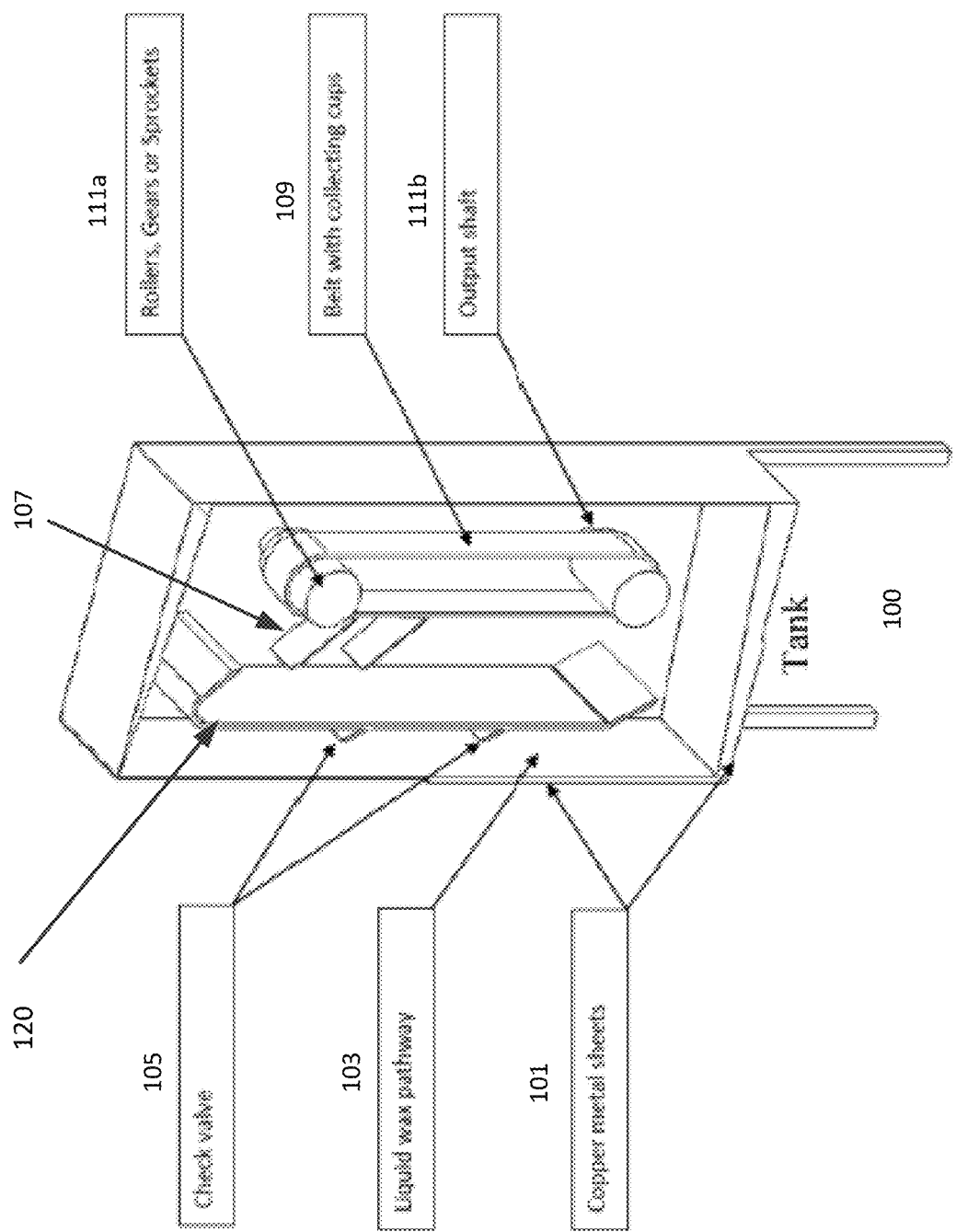
FIG. 1 is an isometric view of the power unit.

Referring now to the drawings, wherein like reference numerals designate identical or corresponding parts throughout several views, the following description relates to a system and method for converting kinetic energy to electrical energy. The system may include a heat source, a tank having a pathway in which wax flows in an oil based on the conversion of heat energy to kinetic energy and drives a pulley, and a generator. It is preferable that the heat be obtained from a renewable energy source, such as sunlight or geothermal heat.

Photovoltaics use sunlight and are capable of directly converting solar energy into direct current electricity using semiconductors. However, photovoltaics systems require a large area and have only been able to achieve 10% to 20% energy conversion efficiency.

Geothermal energy is a source of thermal energy that is generated and stored in the Earth. At depths of just a few hundred feet, the temperature of the Earth is about 15° C. At depths of a few kilometers, the temperature is hot enough to turn water into steam. One approach to implementing a geothermal energy system is to pipe water down into the Earth to a depth that can heat the water to one temperature, and the water will be returned to the surface at a desired temperature. Circulation of the water generally requires at least one pump.

When solar energy is used to generate heat as a heat source, the disclosed system is predicted to achieve much higher energy conversion efficiency for generating electrical energy than photovoltaics. It has been predicted that output energy of the disclosed system may range up to about 49% of the input energy, which is a higher energy conversion than that of most residential Photovoltaics (PV) systems, for which the energy conversion ranges from 10% to 20%. Unlike other methods for generating electrical energy utilizing kinetic energy, such as the static weight method, fluid flow methods, or a combination of a container and fluid flow, as described above, the disclosed solar powered system does not require any external work or source of power.

FIG. 1 is an isometric view of the power unit according to an exemplary aspect of the disclosure. The power unit (herein called the "Lava-Lamp System" or "LLS"), as in FIG. 1, operates on the basic principles of compressibility and thermal convection. The power unit may be contained in a tank 100. In one embodiment, the tank is made of copper metal sheets 101. In another embodiment, the copper metal sheets cover one or more flat exposed sides or faces of the tank, e.g., one or more of a top surface, a bottom surface, a side surface, a front surface or a back surface. In another embodiment, the copper metal sheets extend to only ½ (half) of the height of the tank, thereby preferably forming a tub-type copper enclosure around a portion of the tank. The tank 100 may include an inner wall 120 to form a liquid wax pathway 103. The inner wall 120 may also be formed of a metal, such as copper. By using copper as the material for the tank and the inner wall, heat can be conducted quickly and distributed evenly. Other materials having good thermal conductivity that may be used include silver, aluminum, stainless steel, nickel alloys, titanium and combinations thereof.

In one embodiment, the inner walls of the tank 100 are of low friction material and there should not be sharp corners. The corners of the tank 100 should instead be curved to minimize fluid friction. In an exemplary aspect, the low friction material of the inner walls of the tank 100 may be a coating of a Polytetrafluoroethylene, such as a Teflon® coating.

In one embodiment, one or more check valves 105 may be included in the liquid pathway 105 to control flow of the liquid. The liquid may be one in which globules of one liquid are suspended in another liquid, and the application of heat causes the globules to ascend and circulate in the tank. It is preferred that the globules have low surface tension so that the globules do not adhere to the walls of the tank. It is preferred that the two liquids be immiscible. The suspension liquid may be water or oil that is immiscible with the globules. In one embodiment, the globules may be made of a material that includes a thickening or gelling agent which is soluble in the liquid and causes the globules to have an increased viscosity or to gel at room temperature. The gelling agent may be a wax, such as paraffin wax, or petroleum jelly. At room temperature, a solidified globule of the wax resides at a lower side of an inclined sheet at the bottom of the tank 100. At an operating temperature, the liquid becomes fluid and the globule begins to ascend as a liquid wax globule. In an exemplary aspect, the operating temperature may be in a range sufficient to melt the wax to produce a liquid wax. As an example, particular paraffin waxes begin to melt at approximately 37° C., and it is preferred that the operating temperature be in the range of 45° to 50° C. for the liquid wax derived from a paraffin wax having a melting point in this range to melt and flow. The liquid wax continues to ascend in a pathway 103 and is forced against the outer wall of the tank 100 by a series of check valves 105. As heat is evenly distributed over the copper wall of the tank 100, the liquid wax accelerates as it ascends. Also, the check valves 105 prevent at least some of the liquid wax globules from dropping back to the bottom of the tank 100. After passing by the check valves 105, the liquid wax moves toward a cooler side of the tank and makes its way over the top of the inner wall 120. As the liquid wax cools, it falls into collecting cups 107. The collecting cups 107 are attached to a continuous belt 109 which rotates as a pulley system around a pair of rotating devices, such as rollers, gears or sprockets 111a and 111b and the like. In some embodiments, the continuous belt 109 may be made of a fiber-reinforced rubber and the collecting cups 107 may be made of a molded plastic that can be glued to the belt 109. In some embodiments, the collecting cups 107 may be made of a light-weight metal, such as aluminum, and mounted onto the belt 109 by a clip mechanism. It is preferred that the continuous belt 109 is held taut by the pair of rotating devices so that collecting cups will hold a quantity of liquid wax without spilling. It is preferred that the collecting cups 107 have a lower side that projects from the belt at an angle, e.g., an angle of about 45°, or be curved, in order to minimize fluid friction as the cups 107 move through the fluid. From the perspective of FIG. 1, the continuous belt 109 rotates counter-clockwise around the rotating devices, such as rollers 111a and 111b. It is preferred that the belt 109 in the vicinity of the upper roller 111a be outside the liquid to minimize fluid friction.

In one embodiment, the lower rotating device, shown as lower roller 111b of the pair of rollers, gears or sprockets may instead be a gearbox having two or more meshed gears to help change the rotation speed from the speed of the belt 109 to a higher or lower rotation speed. Other mechanisms may be used to change rotational speed, such as a belt-driven pulley system. The system may take solar thermal energy from the sun and, after a series of transductions, output electrical energy. The goal of the system is to produce a clean electrical energy source without the need to input any power from non-renewable or expensive energy sources.

In the case that the system takes a solar thermal input, a factor in energy production is the weather; on a clear day, the sun being overhead may concentrate more heat than on an overcast day past its zenith. In principal, heat from a solar concentrator may be used to heat wax in a lava Lamp®, which is contained in an oil container such that the wax floats upward when heated, producing a convection current in the oil and displacing material downward.

Figure 2:
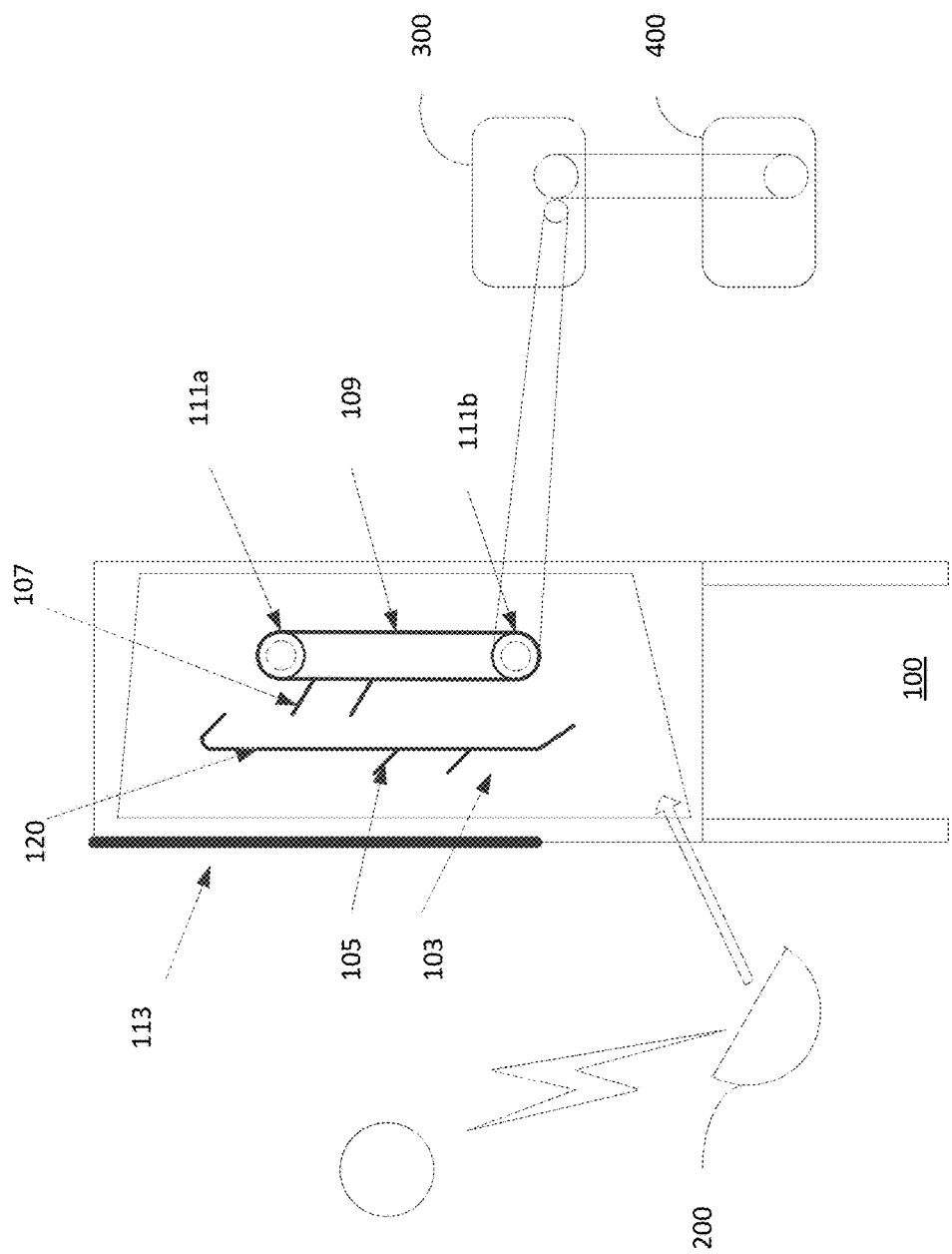
FIG. 2 is a front view of the power unit; updated down.

FIG. 2 is a schematic of the system according to an exemplary aspect of the disclosure. Heat from a heat source warms the wax in a reservoir and the melting wax flows through the liquid wax pathway 103 and the flow of the liquid wax is controlled by check valves 105. In one embodiment, the heat source is a solar concentrator 200 that collects sun radiation and generates heat energy to warm the wax in the reservoir. The solar concentrator 200 may include one or more lenses made of glass or plastic or may have a system of lenses and mirrors that concentrate solar energy into heat energy. In one embodiment, the solar concentrator 200 is a Fresnel lens that focuses sun light to a specific spot on the tank 100. The focused light beam may generate heat energy. The amount of heat energy should be an amount required to melt the wax and cause it to ascend in the pathway 103. The cooler falling wax collects on the collecting cups 107 to cause the pulley to rotate and produce useful mechanical work. This downward displacement moves a generator linkage, producing electrical power. In particular, rotation of the pulley 109 is translated into rotation within a gearbox 300, and the rotation of the gearbox 300 is translated into rotation of a generator 400. Overall, the transduction of energy is as follows:

$$\text{Solar Heat} \rightarrow \text{Kinetic}_{(Wax\ movement)} \rightarrow \text{Mechanical}_{(Generator)} \rightarrow \text{Electrical}.$$

Figure 3:
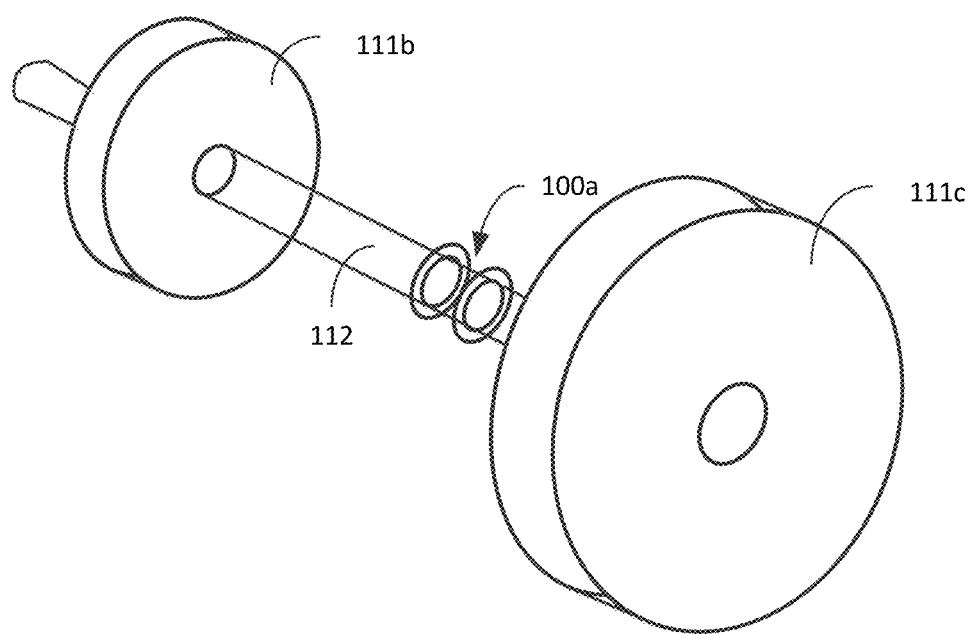
FIG. 3 is an isometric view of a pulley arrangement in the power unit.

FIG. 3 is an isometric view of a pulley arrangement in the power unit. The pulley, gear or sprocket 111b may drive a shaft 112. The shaft 112 is partially inside the tank 100 and partially outside of the tank 100, and passes through a wall 100a of the tank 100. The portion of the shaft 112 that is extended outside the tank 100 is fitted with another pulley, gear or sprocket 111c to transmit the mechanical rotational energy to the gear box 300 located outside the tank 100.

Figure 4:
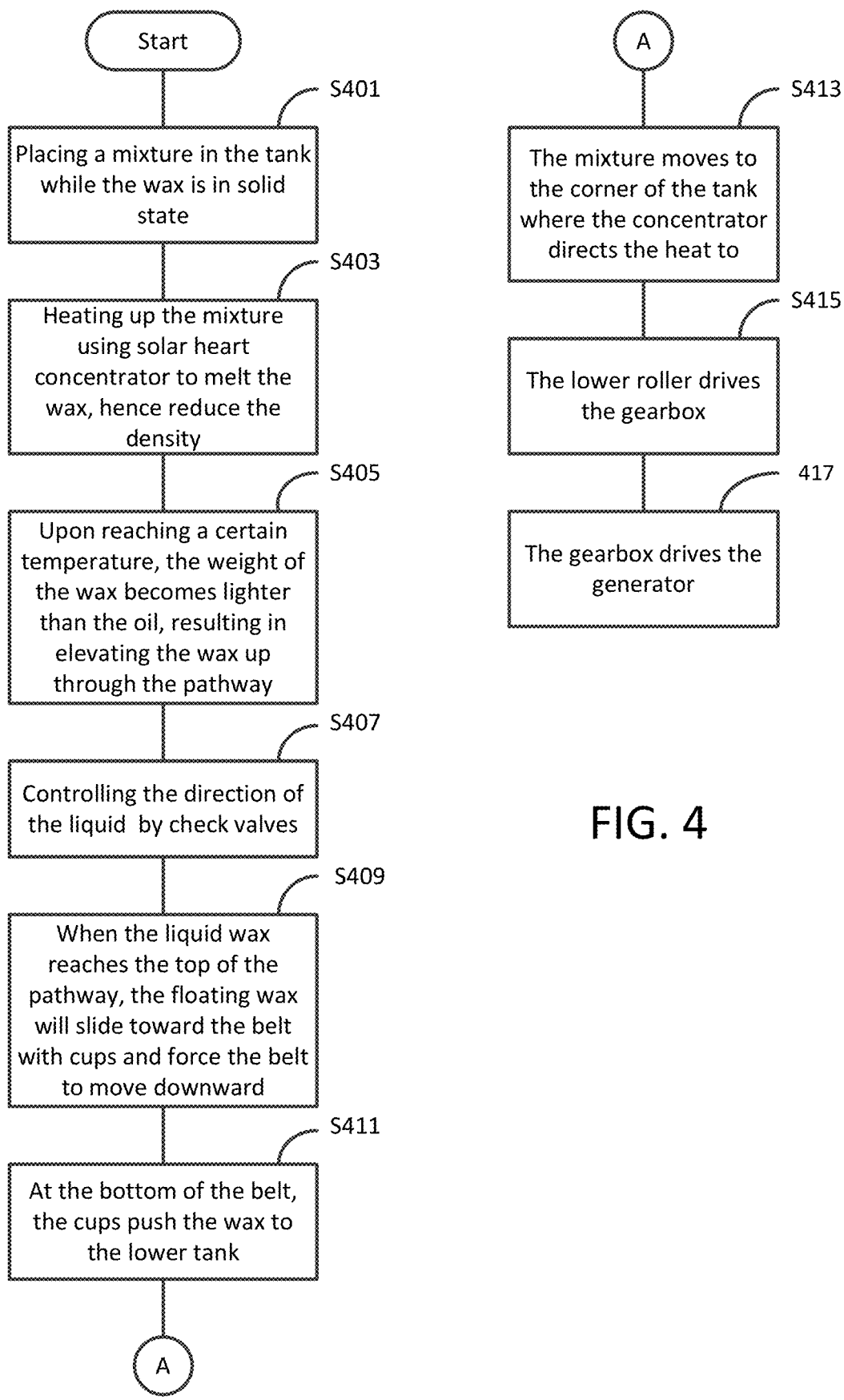
FIG. 4 is a flowchart for operation of the power unit.

Operation:

FIG. 4 is a flowchart for operation of the power unit according to an exemplary aspect of the disclosure. The operation of the power unit is in the following sequence:

1. In S401, the mixture is placed in the tank while the wax is in solid state.
2. In S403, the mixture is heated up using the solar heat concentrator to melt the wax, thereby reducing its density.
3. In S405, at a certain temperature, the wax becomes lighter than the oil, resulting in the wax moving up through the pathway.
4. In S407, the direction of the liquid is controlled by check valves.
5. In S409, when the liquid wax reaches the top of the pathway, the floating wax will slide toward the belt with cups and force the belt to move downward.
6. In S411, at the bottom of the belt (at the lower roller), the cups push the wax (regardless of whether the wax is liquid or solid, depending on the temperature of the liquid and the wax) to the lower tank.
7. In S413, the floor of the tank is tilted to have the mixture move to the corner of the tank where the concentrator directs the heat to.
8. In S415, the lower roller is connected to and drives the gearbox.
9. In S417, the gearbox is coupled with and drives the generator. It is preferred that the generator rotate at some rated speed. In one embodiment, a generator may be driven to rotate at 1750 rpm for 4 pole machines to generate power at 60 Hz.

These steps are preferably performed smoothly to avoid undesired fluctuation in the generator rpm. An additional check valve may be added between the tank and the pathway to force the mixture to move upward during the heating process.

It is preferred that the electricity generating system receive reliable, continuous or semi-continuous renewable energy input. As mentioned above, possible renewable energy sources include sunlight, hydraulic, geothermal, and other naturally occurring sources of energy. It is preferred that the system utilize renewable energy conversion (no fossil fuels or other non-renewables should be used for transduction). In the case of a system that receives energy input from the sun, the system is preferably placed at a location that receives a steady amount of radiation from the sun.

It is preferred that the system generate a reasonable power output vs. input (high power conversion efficiency). It is preferred that the system generate enough power output to be useful for a particular purpose. Many systems exist which can create negligible power, but the system needs to provide electrical energy at a rate to be efficient and/or practical, without the system becoming so large that it would be very costly to produce. As will be described more below, it is estimated that the disclosed electric generating system may generate about 1 to 1.5 kW/m²-day. For comparison purposes, this would be approximately the amount of power that would be consumed by a 60-watt light bulb in a day.

Design Specifications and Considerations:

In the disclosed system, energy must go through conversions before being output as electricity. This type of energy conversion is similar to that found in common traditional power generating systems. Therefore, the maintenance of this system would not be difficult for most of the specialist engineers and technicians. Additionally, the availability and rate of input power (solar) may be continuous and high in countries close to the equator, resulting in greater output power rates. In order to understand the process of designing such an energy conversion system, the incoming energy rates and the corresponding losses in the conversions are considered next.

Hysteresis in Transduction

Hysteresis refers to the energy in a system that is used in undesirable ways, resulting in "losses" to the useful energy output. The most referred to source of hysteresis is due to friction: fluids and solids both experience friction during motion, resulting in generation of heat between the mating materials. This heat is actually a portion of the input energy and is considered to be energy loss that lowers the efficiency of the system. Forms of hysteresis found in the disclosed system are: fluid friction, sliding/rolling friction, heat transfer and electrical resistance.

Incoming Energy Rates in Solar vs. Electricity

The disclosed system may rely on any source of heat, preferably a renewable source such as geothermal energy. In one embodiment, water may be transferred in a pipe down to a depth that would heat the water to a first temperature. The water may be returned back to the Earth's surface providing a desired temperature of water that is sufficient to melt the wax, e.g., in the range of 45 to 50° C. In one embodiment, water may be returned back to the Earth's surface at a temperature and pressure that can be used to power a heat pump, and energy from the heat pump can be used to melt the wax.

General Analytical Analysis of the Disclosed System

In this section, the general analysis of the disclosed system is determined, with variables in place of actual numerical values. The system is analyzed step-by-step, starting with the energy input (in this example solar energy is used as the source of heat) and ending with the expected electrical output.

This analysis assumes that heat transfer equilibrium is reached, meaning that the wax and other system components have reached a temperature where heat in =heat out.

Solar Output

The heat provided by the sun is called solar insolation and refers to the radiation levels of the sun. This is the maximum heat power produced by the sun per unit area per day (Power/area/day).

$$S_i = \text{Given} = \frac{\frac{P_S}{A}}{T}$$

$$P_S = (S_i * T * A)$$

This is an idealized value, assuming that no heat loss occurs in the surroundings, including the cost of heating up the actual mechanism (liquid wax reservoir).

The effective solar power accounts for this heat transfer or heat loss as shown below.

$$= (S_i * T * A) - (H_{surr.})$$

The heat loss due to the surroundings varies depending on ambient temperature, air convection, the coefficient of heat transfer of the various materials used in the device, and the emissivity of the liquid wax reservoir. Overall, of the heat that hits the solar concentrator 200, approximately 90% can be expected to actually heat the system.

Reservoir Convection

The bottom of the tank 100 may contain a tilted metal sheet so that the wax slides towards the solar concentrator 200. The tilt angle should be sufficient to allow the wax to slide. In practice, the tilt angle may be in a range of 5° to 15°. Thus, the bottom of the tank 100 serves as a reservoir. The reservoir, assuming it has reached thermal equilibrium, will have some heat-differential from a heated side to a cooling side of the reservoir. The heat differential between left and right ends of the reservoir may be just a few degrees (e.g., 2 degrees C.) to several degrees (e.g., 10 degrees C.) depending on the size of the reservoir and the area of the bottom of the reservoir that is heated by the heat source. This heat differential creates convection currents in the liquid wax, with the melted wax shifting up and down to serve as an accelerator of these currents. Thus, much energy loss will occur in the reservoir. In particular, as the wax heats and shifts, it encounters two types of energy loss, heat and friction.

Unless the system is extremely well insulated, the bulk of the loss will be from the heat loss of the wax, which heat loss causes the wax to "soak up" more heat from the solar concentrator 200 to continue moving upward at a quick pace. This heat soak means that there will be less heat that goes into the wax at the bottom of the reservoir, thereby slowing down the convection of the wax and the oil. A way to combat this would be to insulate the system extremely well, however, there is a caveat to this. A well-insulated system reduces the heat-differential between the top and bottom and left and right sides of the reservoir. This heat-differential is the reason for the liquid wax and the oil to move in a current the larger the differential, the faster the current and the more power (all else being equal) that the system produces. Therefore, the disclosed system is designed to minimize heat loss without undermining the heat-differential in the reservoir.

In one embodiment, the system may be thermally insulated with a thermal insulation material 113, such as Glass Wool, polystyrene, and/or foam, which covers a portion of the tank's wall extending substantially from a vicinity of the bottom edge of the inner wall 120 to the top of the tank 100. It is preferred that the insulation material have a thermal transmittance of 1.25 $Km^2/W$ or less, where K is Kelvin scale, m is meters, and W is Watt.

The system may involve several energy conversions, each resulting in some energy loss. The system relies on heat, which is then transferred from the energy source to the wax. The heat energy of the wax is transferred to the collector cup belt in the form of kinetic energy, which is then transferred to the generator to produce electricity.

Friction is generally a small component of the loss in fluids compared to the heat in this system. In an exemplary aspect, the walls of the tank have a low friction material on the inner surface. It is preferred that the container geometry have absolutely no sharp corners. All corners of the tank, as well as the collector cups, should be curved to minimize fluid friction. The level of curvature should be sufficient to allow fluid to flow past the bottom of the cups. As mentioned above regarding FIG. 3, the output shaft 112 has one pulley, gear or sprocket inside the tank 100 and it is driven by the belt 109 with the collecting cups 107. The output shaft 112 is also extended outside the tank and fitted with another pulley, gear or sprocket 111*c* to transmit the mechanical rotational energy to the gear box 300 located outside the disclosed system. It is preferred that only one end of the collector cup belt should be submersed in fluid. The upper end of the belt should be outside the fluid to minimize fluid friction. In one embodiment, the roller of the submersed end of the belt may be replaced with a gearbox input. In one embodiment, the step between the pulleys and the gearbox may be completely eliminated, such that the top end of the belt has a pulley and the bottom end has a gearbox. It is preferred that the gears in a gearbox be made of acetal or Teflon®, and torque limited to prevent overstressing.

In one embodiment, a check valve may not be necessary between the tank and a lower entrance point of the pathway. The liquid wax and oil may move correctly according to the heat-differential and produce necessary convection currents.

Overall, the average heat loss in an insulated system can be assumed to be approximately 8%. The friction loss of the fluid could be approximately 5%, but the wax in the system will increase that loss to, perhaps, up to 8%. Also, special consideration must be given to the fact that not 100% of the falling wax on the collecting cups 107 can be expected to do useful work. It may be the case that approximately 25% of the wax may fall uselessly, i.e., miss the collecting cups 107. Without precise control of the wax convection current, there may be some waste.

The belt 109, rollers 111*a* and 111*b*, gearbox 300, and generator 400 all operate on the same principle of mechanical rotation, and thus are all governed by the same types of losses. The collecting cups 107 are mounted on the belt 109, which rotates around rollers and/or gears 111*a* and 111*b* as a pulley system. The pulley system may be mounted on ball bearings to reduce friction on their mounting shaft, such that the losses due to friction on the pulley system are small—usually around 4-10%. However, because the pulley system is partially submersed in oil, fluid friction must also be accounted for. This means that the actual losses may approach 15%. Gearboxes 300 can be very efficient or very inefficient, depending on the type and build quality. Most gearboxes are in the realm of 80% efficient, which means 20% losses. Finally, the generator 400 converts the final mechanical rotation into electrical energy. The generator 400 can be highly efficient due to its being mounted on ball bearings. Losses are usually in the order of 4-10%, about the same as those for a pulley system. Overall, the losses due to these mechanisms (pulley system partially submersed in a fluid, gearboxes, and generator) may be in the range of: 4-10%, 20%, and 4-10% respectively.

Below is shown the system efficiency at each point. Note that the percentage is of initial input energy.

Input Heat=100%
Collected Heat=90%
Energy after fluid heat loss=76.5%
Energy after fluid friction=70.38%
Energy after pulley friction=65.45%
Energy after gearbox=52.36%
Output Efficiency=48.7%.

A desert sun will provide 7 $kW/m^2$/day. The disclosed electricity generating system would produce a maximum of 3.4 $kW/m^2$/day, assuming that the sun shines all day. However, at an output efficiency of 48.7%, the actual electricity generated at most temperate locales would be more in the order of 1-1.5 $kW/m^2$ day.

This is a very general approximation of maximum system efficiency for standard components at the present configuration. This does not take into account the following:

Increased friction of wax in the reservoir vs. oil
Loss due to not all of the wax performing useful work
Losses due to fluid friction on pulley system and collector cups.

Comparison of Other Solar Collection Systems

|  | Multiple Conversions | Extensive Heat Loss | Complex Assembly and Installation | Common practice | Size/KW | Efficiency in high temperature weather |
|---|---|---|---|---|---|---|
| "LLS" | YES | YES | NO | Generate electricity | Acceptable | High |
| Solar-Electric | YES (AC/DC) | NO | YES | Generate electricity | Huge (unacceptable) | Low |
| Vacuum Tube Solar Thermal | NO | NO | No | Water heater | Acceptable | High |

The system is feasible to operate in comparison to other solar energy systems. The system converts the energy many times, resulting in various losses. However, the predicted output energy which ranged up to almost 49% is higher than most residential Photovoltaics (PV) systems which ranged from 10% to 20%.

The invention claimed is:

1. A convective power generation system, comprising:
a tank containing:
a continuous belt with collecting cups, wherein the continuous belt is held taut by at least one pair of rotating devices, including a top rotating device near a top of the tank and a bottom rotating device near a bottom of the tank; and a metal plate arranged vertically inside the tank between a vertical side wall of the tank and the top rotating device and the bottom rotating device and is substantially parallel to the vertical side wall and forms a pathway between the metal plate and the vertical side wall of the tank;
a heat source that applies heat energy toward a bottom portion of the tank that contains wax and oil;
a gearbox having at least one gear driven by a rotation of the continuous belt; and
a generator driven by the gearbox,
wherein
the heat source produces an amount of heat sufficient to melt at least a portion of the wax into liquid wax;
the pathway is configured to move the liquid wax up through the pathway;
a curved portion of the metal plate is configured to allow the liquid wax to slide towards the collecting cups;
the continuous belt is configured to rotate as the liquid wax falls into the collecting cups;
the gearbox is configured to be driven by the rotation of the continuous belt; and
the generator is connected to the gearbox to produce electrical power.

2. The system of claim 1, further comprising a solar concentrator that concentrates solar energy into heat as the heat source.

3. The system of claim 1, wherein the collecting cups have a curved shape.

4. The system of claim 1, wherein the bottom rotating device is the gearbox.

5. The system of claim 1, wherein a bottom of the tank is tilted such that melted wax falling from the collecting cups slides towards a lower heated side of the tank.

6. The system of claim 1, wherein an upper-side of the continuous belt does not contact the oil and the liquid wax.

7. The system of claim 1, further comprising check valves located in the pathway to control a direction of movement of the liquid wax up through the pathway.

8. The system of claim 1, further comprising an insulation material on a wall of the tank that is parallel to the metal plate and substantially extending length of the metal plate along a direction of movement of the liquid wax.

9. A convective power generation method, the method being performed by a convective power generation system comprising:
a tank containing:
a continuous belt with collecting cups, wherein the continuous belt is held taut by at least one of a pair of rotating devices, including a top rotating device near a top of the tank and a bottom rotating device near a bottom of the tank; and
a metal plate arranged vertically inside the tank between a vertical side wall of the tank and the top rotating device and the bottom rotating device and is substantially parallel to the vertical side wall and forms a pathway between the metal plate and the vertical side wall of the tank; and
a heat source that applies heat energy toward a bottom portion of the tank that contains wax and oil;
a gearbox having at least one gear driven by a rotation of the continuous belt; and
a generator driven by the gearbox,
the method comprising:
melting, by the heat source, the wax into liquid wax;
moving, by convection currents in the oil, the liquid wax up through the pathway;
sliding the liquid wax over a curved portion of the metal plate towards the collecting cups;
rotating the continuous belt as the liquid wax falls into the collecting cups;
driving the gearbox by the rotation of the continuous belt; and
rotating the generator which is connected to the gearbox to produce electrical power.

10. The method of claim 9, further comprising concentrating, by a solar concentrator, solar energy into heat as the heat source.

11. The method of claim 9, wherein the collecting cups have a curve-shaped lower side, wherein the rotating of the continuous belt causes the curve-shaped lower side of the collecting cups to move smoothly through the oil.

12. The method of claim 9, wherein the bottom rolling device is the gearbox, and
wherein the driving of the gearbox includes directly driving the gearbox by the rotation of the continuous belt.

13. The method of claim 9, wherein a bottom of the tank is tilted, and the method further comprises moving melted wax falling from the collecting cups towards a lower heated side of the tank along the tilted bottom of the tank.

14. The method of claim 9, wherein an upper-side of the continuous belt does not contact the oil and the liquid wax.

15. The method of claim 9, wherein check valves are located in the pathway, and the method further comprising controlling, by the check valves, a direction of movement of the liquid wax up through the pathway.

16. The method of claim 9, wherein the liquid wax in the collecting cups remains liquid while the continuous belt rotates.

* * * * *